United States Patent
Galligan et al.

(10) Patent No.: US 8,833,064 B2
(45) Date of Patent: Sep. 16, 2014

(54) SMALL ENGINE LAYERED CATALYST ARTICLE AND METHOD OF MAKING

(75) Inventors: Michael P. Galligan, Cranford, NJ (US); Pascaline H. Tran, Holmdel, NJ (US); Keshavaraja Alive, South Plainfield, NJ (US); Ye Liu, Holmdel, NJ (US)

(73) Assignee: BASF Corporation, Florham Park, NJ (US)

( * ) Notice: Subject to any disclaimer, the term of this patent is extended or adjusted under 35 U.S.C. 154(b) by 630 days.

(21) Appl. No.: 12/916,676

(22) Filed: Nov. 1, 2010

(65) Prior Publication Data

US 2011/0107752 A1    May 12, 2011

Related U.S. Application Data

(60) Provisional application No. 61/258,783, filed on Nov. 6, 2009.

(51) Int. Cl.
| | | |
|---|---|---|
| *F01N 3/10* | (2006.01) | |
| *B01D 53/56* | (2006.01) | |
| *B01D 53/94* | (2006.01) | |
| *B01J 8/02* | (2006.01) | |
| *C01B 21/00* | (2006.01) | |
| *C01B 23/00* | (2006.01) | |
| *C01B 25/00* | (2006.01) | |
| *C01B 31/00* | (2006.01) | |
| *C01B 33/00* | (2006.01) | |
| *C01B 35/00* | (2006.01) | |
| *C01G 28/00* | (2006.01) | |
| *C01G 30/00* | (2006.01) | |
| *B01J 23/00* | (2006.01) | |
| *B01J 21/00* | (2006.01) | |
| *B01J 37/04* | (2006.01) | |
| *B01J 23/63* | (2006.01) | |
| *B01J 37/02* | (2006.01) | |
| *B01J 21/06* | (2006.01) | |

(52) U.S. Cl.
CPC .............. *B01J 37/0244* (2013.01); *B01J 37/04* (2013.01); *B01D 53/945* (2013.01); *B01J 23/63* (2013.01); *B01D 2255/1025* (2013.01); *B01D 2255/2066* (2013.01); *B01D 2255/9022* (2013.01); *B01J 37/0219* (2013.01); *B01J 37/0201* (2013.01); *B01J 37/0248* (2013.01); *Y02T 10/22* (2013.01); *B01D 2255/1023* (2013.01); *B01J 21/066* (2013.01); *B01D 2255/2065* (2013.01); *B01D 2255/2068* (2013.01); *B01D 2255/908* (2013.01); *Y10S 502/52712* (2013.01); *Y10S 502/52713* (2013.01)
USPC .......... 60/299; 423/213.5; 502/261; 502/262; 502/304; 502/326; 502/332; 502/333; 502/334; 502/339; 502/349; 502/350; 502/351; 502/355; 502/415; 502/439; 502/527.12; 502/527.13

(58) Field of Classification Search
USPC ......... 502/261–262, 304, 326, 332–334, 339, 502/349–351, 355, 415, 439, 527.12, 502/527.13; 60/299; 423/213.5
See application file for complete search history.

(56) References Cited

U.S. PATENT DOCUMENTS

| | | | |
|---|---|---|---|
| 4,171,288 A | 10/1979 | Keith et al. | |
| 4,714,694 A | 12/1987 | Wan et al. | |
| 4,923,842 A | 5/1990 | Summers | |
| 5,057,483 A | 10/1991 | Wan | |
| 5,597,771 A | 1/1997 | Hu et al. | |
| 5,898,014 A | 4/1999 | Wu et al. | |
| 5,948,723 A * | 9/1999 | Sung | 502/303 |
| 6,261,989 B1 * | 7/2001 | Tanaka et al. | 502/217 |
| 6,294,140 B1 * | 9/2001 | Mussmann et al. | 423/213.5 |
| 6,306,794 B1 * | 10/2001 | Suzuki et al. | 502/304 |
| 6,478,874 B1 | 11/2002 | Rosynsky et al. | |
| 6,764,665 B2 | 7/2004 | Deeba et al. | |
| 6,764,995 B2 * | 7/2004 | O'Reilly et al. | 514/13.3 |
| 6,881,384 B1 * | 4/2005 | Uenishi et al. | 422/177 |
| 7,022,646 B2 | 4/2006 | Li | |
| 7,276,212 B2 * | 10/2007 | Hu et al. | 422/177 |
| 7,314,846 B2 * | 1/2008 | Kuno | 502/326 |
| 7,374,729 B2 * | 5/2008 | Chen et al. | 422/177 |

| | | | |
|---|---|---|---|
| 7,396,516 B2 * | 7/2008 | Fisher et al. | 423/213.2 |
| 7,501,098 B2 * | 3/2009 | Chen et al. | 422/177 |
| 7,517,510 B2 * | 4/2009 | Chen et al. | 423/213.2 |
| 7,524,465 B2 * | 4/2009 | Kumar et al. | 422/180 |
| 7,550,124 B2 * | 6/2009 | Chen et al. | 423/213.2 |
| 7,622,096 B2 * | 11/2009 | Deeba et al. | 423/213.2 |
| 7,754,171 B2 * | 7/2010 | Chen et al. | 423/213.2 |
| 7,758,834 B2 * | 7/2010 | Chen et al. | 423/213.2 |
| 7,759,283 B2 * | 7/2010 | Yamato et al. | 502/339 |
| 7,785,545 B2 * | 8/2010 | Miyoshi et al. | 422/180 |
| 7,795,172 B2 * | 9/2010 | Foong et al. | 502/327 |
| 7,816,300 B2 * | 10/2010 | Takeuchi et al. | 502/325 |
| 7,871,956 B2 * | 1/2011 | Wakita et al. | 502/304 |
| 7,875,250 B2 * | 1/2011 | Nunan | 422/177 |
| 7,879,755 B2 * | 2/2011 | Wassermann et al. | 502/304 |
| 7,922,988 B2 * | 4/2011 | Deeba et al. | 423/213.2 |
| 7,947,238 B2 * | 5/2011 | Deeba | 423/213.2 |
| 7,981,390 B2 * | 7/2011 | Galligan et al. | 423/213.5 |
| 8,007,750 B2 * | 8/2011 | Chen et al. | 423/239.1 |
| 8,038,951 B2 * | 10/2011 | Wassermann et al. | 422/168 |
| 8,202,819 B2 * | 6/2012 | Kohara et al. | 502/304 |
| 8,211,392 B2 * | 7/2012 | Grubert et al. | 423/213.2 |
| 8,568,675 B2 * | 10/2013 | Deeba et al. | 423/213.5 |
| 8,637,426 B2 * | 1/2014 | Hoke et al. | 502/339 |
| 2001/0036432 A1 * | 11/2001 | Hu et al. | 423/213.5 |
| 2004/0028589 A1 * | 2/2004 | Reisinger et al. | 423/240 S |
| 2004/0038819 A1 | 2/2004 | Galligan et al. | |
| 2006/0171866 A1 | 8/2006 | Galligan | |
| 2008/0044330 A1 * | 2/2008 | Chen et al. | 423/213.5 |
| 2009/0022641 A1 * | 1/2009 | Chen et al. | 423/239.1 |
| 2009/0041645 A1 * | 2/2009 | Wassermann et al. | 423/213.5 |
| 2010/0183490 A1 * | 7/2010 | Hoke et al. | 423/213.5 |

FOREIGN PATENT DOCUMENTS

WO    WO-95/35152    12/1995

\* cited by examiner

*Primary Examiner* — Cam N. Nguyen

(74) *Attorney, Agent, or Firm* — Melanie L. Brown

(57) ABSTRACT

Catalyst articles comprising substantially only a palladium precious metal component in a first catalytic layer and a rhodium component in a second catalytic layer and related methods of preparation and use are disclosed. Also disclosed is a catalyst article comprising a first layer formed on a carrier substrate, wherein the first layer comprises a refractory metal oxide and has a surface that is substantially uniform; a second layer formed on the first layer, wherein the second layer comprises i) an oxygen storage component that is about 50-90% by weight of the second layer and ii) a palladium component in an amount of about 2-5% by weight of the second layer, wherein the palladium component is substantially the only platinum group metal component, and a palladium-free third layer comprising a rhodium component supported on a thermostable oxygen storage component which is about 80-99% by weight of the second layer. One or more improved properties are exhibited by the catalyst article.

20 Claims, 1 Drawing Sheet

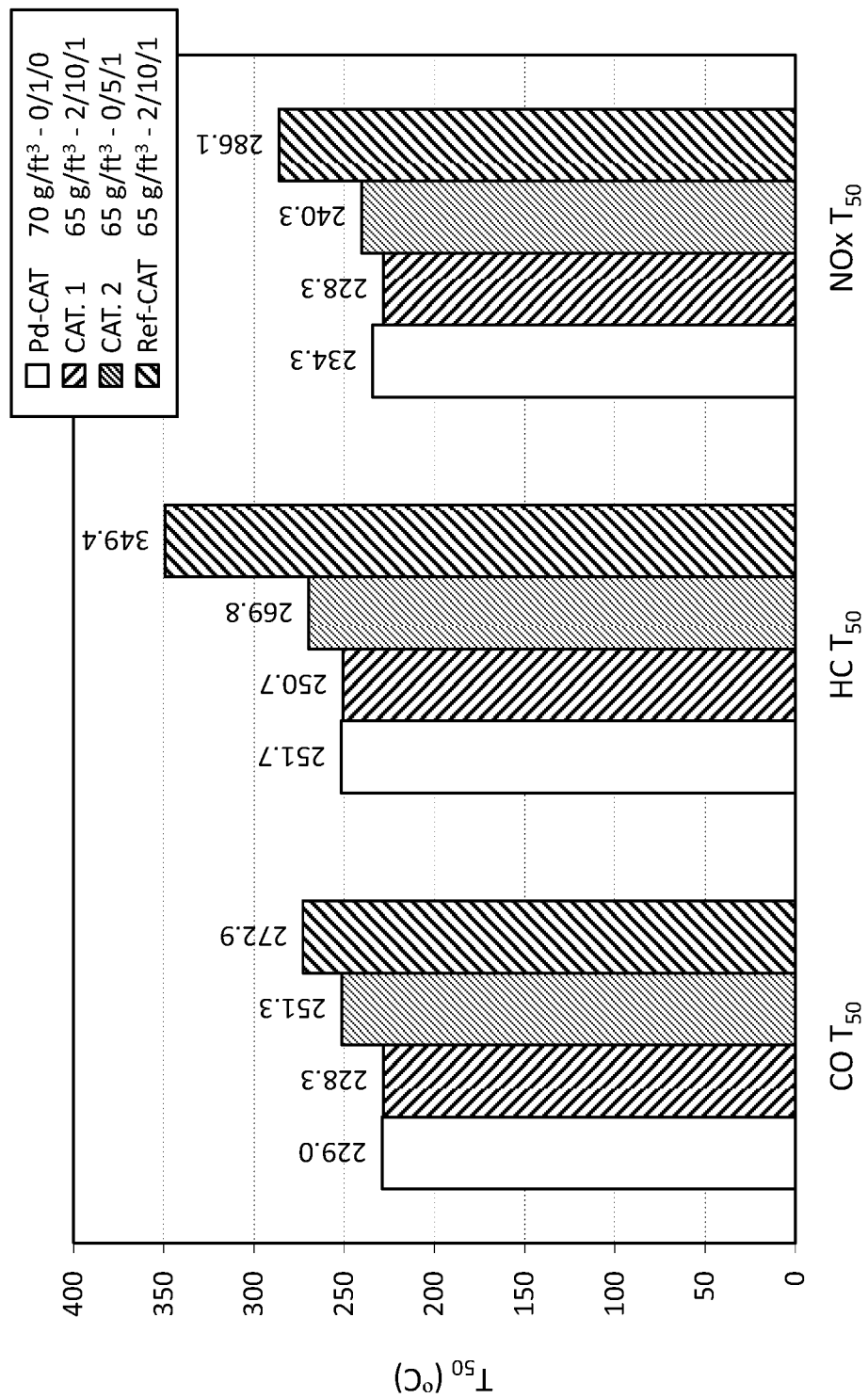

SMALL ENGINE LAYERED CATALYST ARTICLE AND METHOD OF MAKING

CROSS-REFERENCE TO RELATED APPLICATIONS

This application claims the benefit of priority under 35 U.S.C. §119(e) to U.S. Provisional Application Ser. No. 61/258,783, filed Nov. 6, 2009, which is incorporated herein by reference.

TECHNICAL FIELD

This invention pertains to catalyst articles useful for treatment of gaseous streams containing hydrocarbons, carbon monoxide and nitrogen oxides, methods of using the catalyst articles to treat the gaseous streams, systems including the catalytic articles, and methods of making the catalyst articles. More particularly, the invention provides catalyst articles and methods for treatment of exhaust produced by small engines.

BACKGROUND

The exhaust gases of internal combustion engines, including small engines, are known to contain pollutants such as hydrocarbons, carbon monoxide and nitrogen oxides ($NO_x$) that foul the air.

Small internal combustion engines, usually two-stroke and four-stroke spark ignition engines are used to provide power to a variety of machinery, e.g. gasoline-engine powered lawn mowers, chain saws, leaf blowers, string cutters, motor scooters, motorcycles, mopeds and the like. Such engines provide a severe environment for a catalytic exhaust treatment apparatus. This is because in small engines, the exhaust gas contains a high concentration of unburned fuel and unconsumed oxygen. A catalyst article can be mounted downstream of the engine inside another structure such as a muffler. Examples of catalytic articles mounted inside of mufflers are described in United States Patent Application Publication No. 20040038819, the entire content of which is incorporated herein by reference.

Additionally, the vibration of a two-stroke engine can be three or four times that of a four-stroke engine. For example, vibrational accelerations of 70 G to 90 G (G=gravitational acceleration) at 150 hertz (Hz) have been reported for small engines. The harsh vibration and exhaust gas temperature conditions associated with small engines lead to several modes of failure in the exhaust gas catalytic treatment apparatus, including failure of the mounting structure by which a catalyst article is secured in the apparatus and consequential damage or destruction of the catalyst article due to the mechanical vibration and to flow fluctuation of the exhaust gas under high temperature conditions. The catalyst article usually comprises a ceramic-like carrier that has a plurality of fine parallel gas flow passages extending therethrough (sometimes referred to as a "honeycomb") and which is typically made of e.g., cordierite, mullite, etc., on which a catalytic materials is coated. The ceramic-like material is subject to cracking and pulverization by excessive vibration and exposure to extremely high space velocities (i.e., the amount of air flowing through the catalyst article, which may be 400-500 K or higher). While ceramic and metal monolithic honeycomb catalysts are known to be used in small engine applications, it is desirable to have alternative designs which are adapted to the smaller space, extreme operating conditions and lower overall cost of small engines. In such cases, metal carriers such as metal plates and metal wire mesh have been used.

Although metal wire mesh can be easily adapted to small spaces and is relatively inexpensive its flexibility makes it prone to degradation of the catalytic layer under the extreme vibration and air flow conditions of a small engine, thus shortening the useful life of the catalyst.

Catalysts useful in small engine applications are described in United States Patent Application Publication No. 20060171866, the entire content of which is hereby incorporated by reference. Briefly, such catalysts comprise one or more platinum group metal compounds or complexes which can be on a suitable support material. The term "compound" means any compound, complex or the like of a catalytic component which, upon calcinations or use of the catalyst, decomposes or otherwise converts to a catalytically active form, which is often an oxide or metal. Various compounds or complexes of one or more catalytic components may be dissolved or suspended in any liquid which will wet or impregnate the support material.

Three-way conversion (TWC) catalysts have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, palladium, rhodium, rhenium and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. The TWC catalyst carrier may also be a wire mesh, typically a metal wire mesh, which is particularly useful in small engines. TWC catalysts can be manufactured in many ways. U.S. Pat. No. 6,478,874, for example, sets forth a system for catalytic coating of a substrate. Details of a TWC catalyst are found in, for example, U.S. Pat. Nos. 4,714,694 and 4,923,842. U.S. Pat. Nos. 5,057,483; 5,597,771; 7,022,646; and WO95/35152 disclose TWC catalysts having two layers with precious metals. U.S. Pat. No. 6,764,665 discloses a TWC catalyst having three layers, including a palladium layer having substantially no oxygen storage components. U.S. Pat. No. 5,898,014 discloses catalyst compositions containing oxygen storage components.

Refractory metal oxides such as alumina, bulk ceria, zirconia, alpha alumina and other materials are known for use as a support for the catalytic components of a catalyst article. The alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Although many of the other refractory metal oxide supports suffer from the disadvantage of having a considerably lower BET surface area than activated alumina, that disadvantage tends to be offset by a greater durability of the resulting catalyst.

In an operating engine, exhaust gas temperatures can reach 600° C. and catalyst out temperatures can exceed 1000° C. Such elevated temperatures cause the activated alumina or other support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al., U.S. Pat. No. 4,171,288, the entire content of which is incorporated herein by reference.

Of the platinum group metals, palladium (Pd) is of particular interest for gasoline engine emission control because of its lower cost relative to platinum (Pt) and rhodium (Rh), its greater availability relative to platinum and its performance advantages relative to other platinum group metals under certain operating conditions. However, in spite of price and availability advantages, there are several problems associated with the use of palladium as the only catalytic material in catalyst articles. Palladium is less resistant to poisoning by fuel and motor oil contaminants than platinum. It is also inferior to platinum in its ability to convert short chain saturated hydrocarbons such as ethane and propane. These disadvantages are partially off-set by the durability of palladium, i.e., it is more resistant to sintering than platinum. Nevertheless, the cost advantages of a palladium-only catalyst article are particularly important for meeting exhaust treatment requirements in the less expensive types of machines that incorporate small engines. There is still a need for a catalyst article based primarily on palladium with improved durability and performance in the harsh environment of the small engine. The present invention addresses this need.

SUMMARY

An embodiment of the present invention is directed to a catalyst article in which palladium is the primary catalytic component in a first catalytic layer, which optionally further includes platinum, and rhodium and optionally platinum are catalytic components in a second catalytic layer, and related methods of preparation and use. The catalyst article comprises a first catalytic layer formed on a carrier or on an undercoat layer adhered to the carrier, wherein the first catalytic layer comprises i) an oxygen storage component and ii) a palladium component, wherein the palladium component is substantially the only platinum group metal component, and; a second catalytic layer formed on the first catalytic layer, wherein the second catalytic layer comprises rhodium and optionally platinum supported on a thermostable oxygen storage component. The second catalytic layer does not contain palladium. In one embodiment, the catalyst article exhibits improved durability and performance relative to palladium-only catalyst articles used in small engines, particularly after aging at 1050° C. in steam/air. The carrier of the catalyst article may be any carrier suitable for use in small engines, such as wire mesh, a metallic monolith or heat tube, or a ceramic carrier which are suitable for use in small engines.

In another aspect of the invention, the catalyst article is made by coating on a carrier i) an undercoat layer comprising a refractory metal oxide in an acidic sol, drying the first layer using heat and airflow such that a substantially uniform surface is formed on the undercoat layer, ii) depositing a first catalytic layer on the undercoat layer by coating a slurry on the undercoat layer, the slurry comprising an oxygen storage component and a refractory metal oxide impregnated with a palladium component, wherein the palladium component is substantially the only platinum group metal component, and drying the first catalytic layer, and iii) depositing a second catalytic layer on the second layer by coating a slurry on the first catalytic layer, the slurry comprising rhodium and optionally platinum supported on an oxygen storage component, and drying the second catalytic layer.

The catalyst articles of the invention are particularly useful for treating exhaust produced by small engines, where operating conditions produce high vibration, high temperature (in the range of 800-1100° C.) and high exhaust flow rates.

DESCRIPTION OF THE DRAWINGS

FIG. 1 is a bar graph comparing CO, NOx and HC light off temperatures for two catalysts according to the invention as compared to two reference catalysts

DETAILED DESCRIPTION

The present invention relates to catalyst articles, components of catalyst articles, methods of using the catalyst articles and methods of making the catalyst articles generally referred to as a three-way conversion catalyst having the capability of simultaneously catalyzing the oxidation of hydrocarbons and carbon monoxide and the reduction of nitrogen oxides. The catalytic article according to one embodiment of the invention comprises two catalytic washcoat layers. In addition, it has been found that by providing a substantially uniform surface on an undercoat layer formed on the carrier prior to addition of the catalytic layers the catalytic layers exhibit improved adherence on the carrier. The catalytic layers therefore have improved durability and performance as compared to conventional multilayer catalyst articles. That is, the catalytic layer of the invention resists cracking and being dislodged from the catalyst article under operating conditions of harsh vibration, such as in a small engine. Accordingly, less platinum group metal is required in the catalyst article, as the ability of the catalyst article to meet regulatory requirements for emissions control is less impacted by physical depletion of the catalytic layer during use of the small engine over time.

As used herein, the term "substantially uniform" with respect to a layer of the catalyst article means the surface of the layer is free of defects over at least about 90% of the total surface area. The substantially uniform surface exhibits no more than about 10% of the total surface area of the layer of cracks, fissures or flaking of the surface of the layer. In certain aspects of the invention, the surface of the layer is at least about 95% defect-free, and in a detailed aspect of the invention it is 100% defect-free. Evaluation of the uniformity of the surface of the layer is readily performed using procedures known in the art, including metallography, scanning electron microscopy (SEM), transmission electron microscopy (TEM) and direct visual inspection of the surface of the layer using, for example, a conventional light microscope.

As used herein, the term "support" with respect to a catalytic layer refers to a material that receives platinum group metals, stabilizers, promoters, binders, and the like through association, dispersion, impregnation, or other suitable methods. Examples of supports include, but are not limited to, refractory metal oxides, high surface area refractory metal oxides and materials containing oxygen storage components. One or more embodiments of the present invention include a high surface area refractory metal oxide support comprising an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. Examples of materials containing oxygen storage components include, but are not limited to, ceria-zirconia, ceria-zirconia-lanthana, yttrium oxides and praseodymium oxides. Reference to a "ceria-zirconia composite" means a composite comprising ceria and zirconia, without specifying the amount of either component. Suitable ceria-zirconia materials include, but are not limited to, materials having, for example, 5%, 10%, 15%, 20%, 25%, 30%, 35%, 40%, 45%, 50%, 55%, 60%, 65%, 70%, 75%, 80%, 85%, 90% or even 95% of ceria content. Certain embodiments provide that the support comprises bulk ceria having a nominal ceria content of 100% (i.e., >99% purity).

As used herein, the term "oxygen storage component" (OSC) refers to an entity that has a multi-valence state and can actively react with oxidants such as oxygen or nitrous oxides under oxidative conditions, or which reacts with a reductant such as carbon monoxide (CO) or hydrogen under reduction conditions. Examples of suitable oxygen storage components include ceria and praseodymia. Delivery of an OSC to the layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium. The term "thermostable" with respect to an OSC refers to an oxygen storage component which is stable with respect to surface area (observed loss of surface area is not detrimental to the functioning of the catalyst) at temperatures of 900° C. or above, or between 900° C. and 1100° C. or between 1050° C. and 1100° C. For example, surface area of the thermostable OSC remains at about 30 $m^2/g$ after treating at 1050° C. under steam.

As used herein, the term "impregnated" means that a platinum group metal-containing solution is put into pores of a support. In detailed embodiments, impregnation of platinum group metals is achieved by incipient wetness, where a volume of diluted platinum group metal is approximately equal to the pore volume of the support bodies. Incipient wetness impregnation generally leads to a substantially uniform distribution of the solution of the precursor throughout the pore system of the support.

As used herein, the terms "palladium component", "platinum component", "rhodium component" and "platinum group metal component" mean any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds include palladium nitrate, platinum nitrate or rhodium nitrate. During the calcination step, or at least during the initial phase of use of the composite, such compounds are converted into a catalytically active form of the metal or a compound thereof.

As used herein, reference to palladium as "substantially the only platinum group metal component" of a layer means that other platinum group metals present in the layer are in amounts less than 10% of the amount of palladium, preferably less than 5% of the amount of palladium.

In a first aspect, the catalyst article of the invention comprises: an optional undercoat layer on a carrier, the undercoat comprising a refractory metal oxide, and a first catalytic layer on the undercoat layer, if present, or directly on the carrier comprising a high level (e.g., 50-90% by weight) of an OSC and a palladium component, wherein the palladium component is substantially the only platinum group metal component. Platinum may optionally be included in the first catalytic layer in a small amount. There is no platinum group metal component in the undercoat layer. Other aspects of the invention provide that the undercoat layer further comprises a high surface area refractory metal oxide, for example a refractory metal oxide having a surface area of about 200 $m^2/g$, such as gamma alumina.

In a further aspect, the OSC is a ceria-zirconia material, which may be present as 50-90%, 60-80% or 65-70% by weight of the first catalytic layer.

In a detailed embodiment, the ceria-zirconia material further comprises lanthana, neodymia, praseodymia, samarium, yttria, or combinations thereof. The ceria-zirconia material can comprise lanthana in an amount in the range of 1-10% by weight to the ceria-zirconia composite.

Another aspect provides that the palladium component of the first catalytic layer is associated onto a refractory metal oxide support in an amount of between about 2% and 5% by weight. Palladium may also be associated onto the refractory metal oxide support in an amount of about 3% to 4% by weight of the support, for example about 3.2% by weight or about 3.46% by weight.

Another aspect provides that the platinum component is associated onto the refractory metal oxide support of the first catalytic layer in an amount of between 0% and 0.5% by weight of the first catalytic layer. Platinum may also be associated onto the refractory metal oxide support of the first catalytic layer in an amount of about 0.04% to 0.08% by weight, or about 0.06% by weight of the first catalytic layer.

Other aspects of the invention provide that the first catalytic layer comprises a refractory metal oxide, such as a high surface area refractory metal oxide. In one or more embodiments, the refractory metal oxide comprises an activated compound selected from the group consisting of alumina, alumina-zirconia, alumina-ceria-zirconia, lanthana-alumina, lanthana-zirconia-alumina, baria-alumina, baria lanthana-alumina, baria lanthana-neodymia alumina, and alumina-ceria. It is particularly desirable that the refractory metal oxide exhibits high temperature resistance. It is also useful in the invention to provide two different refractory metal oxide supports in the first catalytic layer, each impregnated with the palladium component and with the optional platinum component. For example the catalytic layer may comprise thermally stable alumina such as rare earth stabilized alumina (for its high temperature resistance) and gamma alumina (for its high surface area) as supports for the palladium and optional platinum components.

In a further aspect of the invention, the first catalytic layer may further comprise a promoter selected from the group consisting of BaO, SrO, $La_2O_3$, $Nd_2O_3$, $Pr_6O_n$, $Y_2O_3$, $Sm_2O_3$, and combinations thereof.

The catalyst article of the invention further comprises a second catalytic layer coated on the first catalytic layer. The second catalytic layer comprises rhodium and optionally platinum associated with an OSC, but does not contain palladium. The OSC of the second catalytic layer is also present in a high amount, typically an amount greater than or equal to the amount of OSC in the first catalytic layer.

One or more embodiments provide that the platinum group metal components of the second catalytic layer are rhodium and, optionally, platinum. A second catalytic layer containing both rhodium and platinum is preferred for certain applications. In such cases, platinum in the second catalytic layer represents the majority of platinum in the catalyst article, for example 80-100% or 90-100% of the platinum in the catalyst article. The rhodium component may be present in an amount of between about 0.2% and 1% by weight of the second catalytic layer, typically about 0.3-0.9% by weight, or about 0.38% or 0.83%. If the second catalytic layer contains platinum, it may be present in an amount of between about 0.2% and 1% by weight of the second catalytic layer, about 0.5% and 1% by weight or about 0.69% by weight. The rhodium component and the platinum component, if present, are supported on a thermostable OSC present in an amount of about 80-99% by weight of the second catalytic layer. The OSC support may be ceria-zirconia or ceria but other OSC supports are also suitable for use in the second catalytic layer. The second catalytic layer typically does not contain alumina, but may optionally include up to about 70% alumina. Preferred OSC supports include thermostable OSCs present in amounts greater than or equal to the amount of OSC in the first catalytic layer. The OSC may be 80-99%, 90-99% or 95-97% by weight of the second catalytic layer.

One or more embodiments provide that the platinum group metal components of the catalyst article are present in a total amount of about 10-150 $g/ft^3$, about 20-100 $g/ft^3$, or about 25-75 $g/ft^3$. In a specific embodiment, the platinum group metal components are present in an amount of about 65-70 $g/ft^3$ in the catalyst article. In another specific embodiment the platinum group metal components of the catalyst article are present in an amount of about 65 $g/ft^3$ in the catalyst article. In such embodiments the weight ratio of platinum group metal components in the catalyst article may be about 0-4PT/3-15Pd/0.5-1.5Rh, for example 2Pt/10Pd/1Rh or 0Pt/5Pd/1Rh.

Other aspects provide that the platinum group metal components in the first catalytic layer may be present in a weight ratio of about 0-1Pt/3-15Pd, for example 0Pt/5Pd or 0.2Pt/10Pd. In the second catalytic layer the platinum group metal components may be present in a weight ratio of about 0-3Pt/0.5-1.5Rh, for example 0Pt/1Rh or 1.8Pt/1Rh.

Other aspects provide methods for treating a gas comprising hydrocarbons and nitrogen oxides, the method comprising: contacting the gas in an exhaust stream of a gasoline engine with a catalyst article, wherein a first catalytic layer of the catalyst article comprises a high level of ceria-zirconia and a palladium component as substantially the only platinum group metal component, wherein any non-palladium platinum group metal component in the first catalytic layer is platinum, and a second catalytic layer of the catalyst article comprises rhodium and, optionally, platinum supported on a thermostable OSC such as thermostable ceria-zirconia or ceria.

One aspect provides a catalyst article comprising: a first catalytic layer on a carrier, the first catalytic layer comprising 50-90% by weight of an OSC comprising ceria-zirconia and a palladium component, wherein the palladium component is substantially the only platinum group metal component and wherein the first catalytic layer is coated on an undercoat comprising a high surface area refractory metal oxide comprising lanthana-alumina. In a further aspect, the first catalytic layer may optionally comprise a small amount of a platinum component. In yet a further aspect, the palladium component of the first catalytic layer and the platinum component of the first catalytic layer, if present, are impregnated on each of two different lanthana-alumina supports. The second catalytic layer of the catalyst article is coated on the first catalytic layer and comprises rhodium. Platinum may also optionally be present in the second catalytic layer. The platinum group metal components of the second catalytic layer are supported on a thermostable OSC such as thermostable ceria-zirconia or thermostable ceria. The thermostable OSC in the second layer is 80-99% by weight of the second catalytic layer.

In another aspect, provided is a method for treating a gas comprising hydrocarbons, carbon monoxide, and nitrogen oxides, the method comprising: contacting the gas in an exhaust stream of a gasoline engine with a catalytic article comprising, on a carrier, 1) a first catalytic layer comprising an oxygen storage component that is about 50-90% by weight of the first catalytic layer and a palladium component, wherein the palladium component is about 3-4% by weight of the first catalytic layer and is substantially the only platinum group metal component of the first catalytic layer; 2) a second catalytic layer coated on the first catalytic layer, wherein the second catalytic layer comprises a rhodium component but does not contain palladium and wherein the rhodium component is about 0.3-0.9% by weight of the second catalytic layer.

The catalyst article of the invention provides a significant reduction in carbon monoxide (CO), hydrocarbon (HC) and nitrogen oxide (NOx) light off temperature compared to a catalyst which does not contain a thermostable OSC in the second catalytic layer. In addition, the % conversion of CO, HC and NOx is significantly higher for the inventive catalyst as compared to the reference catalyst. In comparison with a palladium-only catalyst article corresponding to only the first catalytic layer, maximum CO % conversion was significantly improved whether or not platinum was present in the inventive catalyst article. HC and NOx % conversion was also significantly improved when the catalyst of the invention contained only palladium and rhodium. It has also been shown that with platinum in the catalyst article of the invention HC and NOx % conversion was equivalent to % conversion using the palladium-only catalyst article, however, the catalyst article of the invention achieved this result using less platinum group metal loading (65 $g/ft^3$ vs. 70 $g/ft^3$).

In general, hot efficiency at 450° C. was significantly improved for CO, HC and NOx when palladium was the only platinum group metal in the first catalytic layer and rhodium was the only platinum group metal in the second catalytic layer. If a small amount of platinum was present in the first and second catalytic layers a substantial improvement in hot efficiency was seen for CO with smaller but measurable improvements in HC and NOx compared to a palladium-only catalyst article. These results were obtained using the catalyst of the invention after aging at 1050° C. for 4 hr. in air and 10% steam.

Many small engines are two stroke or four stroke engines that are calibrated on the rich side of stoichiometric. Air is injected into the exhaust to promote complete oxidation, and the catalytic article can encounter temperatures up to and in excess of 500° C. As used herein, "rich" refers to a lambda value in the range of about 0.9 to 1, specifically, in the range of about 0.94 to 0.98, and more specifically, in the range of about 0.95 to 0.97. Such a regime is especially applicable to small engines. The improved performance of the catalyst article of the invention as described above is seen under the rich operating conditions found in two stroke and four stroke engines. In experiments evaluating catalyst performance through lambda sweep, % conversion of CO and NO at lambda <1 was substantially higher for the two-layer catalyst article of the invention as compared to a reference catalyst article having a single palladium-only catalytic layer.

A further aspect provides a method of making a catalyst article, the method comprising: optionally, forming an undercoat on a carrier by coating a refractory metal oxide, preferably a high surface area refractory metal oxide, on the carrier. Coating may be accomplished by any of the coating methods known in the art, such as manual dipping or airbrushing. The undercoat is subsequently dried using heat and air, selecting the temperature and airflow such that a substantially uniform undercoat surface is formed. Typically, the drying temperature can be in the range of about 60-140° C. In a specific embodiment, drying of the undercoat layer is accomplished in the range of about 70-110° C., more specifically in the range of about 80-90° C. A gentle to moderate airflow is maintained across the carrier during drying of the undercoat, as may be provided by a conventional fan. The airflow may be provided by any suitable means, and will be determined by the size and/or configuration of the drying furnace. The undercoat layer is then calcined, typically at 490-550° C. for 1-2 hrs. The desired surface uniformity is determined by visual or microscopic methods, such as direct visualization by light microscopy, scanning electron micrographs, metallography, and the like. In a particular aspect, the undercoat is preferably thin, for example less than 10 μm in thickness. In further embodiments, the undercoat is 1-8 μm in thickness, 1-5 μm in thickness, 1-3 μm in thickness or about 1 μm in thickness. A thin undercoat and a substantially uniform undercoat surface increase adherence of the catalytic layer to the undercoat and to the carrier. A first catalytic layer is coated on the undercoat. The first catalytic layer coating is accomplished by depositing a catalytic material comprising a high amount of an OSC component (in certain aspects 50-90%, 60-80% or 65-70% by weight of the first catalytic layer) and a palladium component (in certain aspects about 2-5% by weight of the first catalytic layer, or about 3-4% of the first catalytic layer), wherein the palladium component is substantially the only platinum group metal component. The first catalytic layer may also comprise platinum as about 0% to 0.5% by weight, about 0.04% to 0.08% by weight or about 0.06% by weight of the first catalytic layer. The first catalytic layer is then dried and calcined, typically at 490-550° C. for 1-2 hrs. A second catalytic layer is then coated on the first catalytic layer. The second catalytic layer comprises a rhodium component as about 0.2% to 1% by weight of the second catalytic layer, about 0.3-0.9% by weight, or about 0.38% or 0.83% by weight. The second catalytic layer may optionally contain platinum which, if present, is in an amount of between about 0.2% and 1% by weight of the second catalytic layer, between about 0.5% and 1% by weight or about 0.69% by weight. The platinum group metal components of the second catalytic layer are supported on a thermostable OSC present as 80-99%, 90-99% or 95-97% by weight of the second catalytic layer. If platinum is present in the second catalytic layer it represent a substantial majority of the platinum in the catalyst article, e.g., 80-100% or 90-100% of total platinum. The catalytic material of the second catalytic layer is applied to the first catalytic layer using methods similar to those described for application of the first catalytic layer. The OSC in the first catalytic layer may be ceria-zirconia-lanthana and the lanthana-alumina in the first catalytic layer may be a high surface area lanthana-alumina, for example having a surface area of about 200 m$^2$/g. The OSC support of the second catalytic layer may be ceria-zirconia or ceria and preferably exhibits high thermostability.

Details of the components of a catalyst article according to the invention are provided below.

The Carrier

According to one or more embodiments, the carrier may be any of those materials typically used for preparing TWC catalysts and will preferably comprise a metal or ceramic structure. Any suitable carrier may be employed, such as a monolithic carrier of the type having a plurality of fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic carrier may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α-alumina, aluminosilicates and the like.

The carriers particularly useful for the layered catalyst composites of the present invention may also be metallic in nature and be composed of one or more metals or metal alloys. The metallic carriers may be employed in various shapes such as corrugated sheet, metal plate, wire mesh or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically-promoting metal components to the carrier.

The Catalytic Materials

The catalytic materials of the present invention are formed in multiple layers. The materials can readily be prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member or wire mesh, which is sufficiently porous to permit the passage therethrough of the gas stream being treated.

The catalytic material can be prepared in layers on the carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$ per dip. To incorporate components such as platinum group metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 500-600° C. for about 1 to about 3 hours. Typically, when palladium is desired, the palladium component is utilized in the form of a compound or complex to achieve dispersion of the component on the refractory metal oxide support, e.g., activated alumina. A suitable method of preparing the first catalytic layer of the layered catalyst composite of the invention is to prepare a mixture of a solution of a palladium compound and at least one support, such as a finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having, for example, a pH of about 2 to less than about 7. The pH of the slurry may be lowered by the addition of an adequate amount of an inorganic or an organic acid to the slurry. Combinations of both can be used when compatibility of acid and raw materials is considered. Inorganic acids include, but are not limited to, nitric acid. Organic acids include, but are not limited to, acetic, propionic, oxalic, malonic, succinic, glutamic, adipic, maleic, fumaric, phthalic, tartaric, citric acid and the like. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry. Additional palladium components may be impregnated in the refractory metal oxide component in a similar manner prior to addition to the slurry. It is particularly useful for realizing the advantages of the invention to provide a catalytic material comprising two different refractory metal oxides in the first catalytic layer, for example one having high temperature resistance and another having high surface area, each of which is impregnated with the palladium component.

In one embodiment, the slurry is thereafter comminuted to result in substantially all of the solids having particle sizes of less than about 20 microns in an average diameter. The comminution may be accomplished in a ball mill or other similar equipment, and the solids content of the slurry may be, e.g., about 20-60 wt %, more particularly about 30-40 wt %. In a particular aspect of the present invention, the solids of the undercoat layer may have a particle size that is smaller than the particle size of the solids in the catalytic layer. In one embodiment, the undercoat particle size is about 6-8 microns and the catalytic layer particle size is about 9-11 microns.

The second catalytic layer, may be prepared and deposited upon the first layer in the same manner as described above for deposition of the first catalytic layer using an OSC as the support for rhodium and, optionally, platinum components. An alumina support may also be included in the second catalytic layer but is not required.

Before describing several exemplary embodiments of the invention, it is to be understood that the invention is not limited to the details of construction or process steps set forth in the following description. The invention is capable of other embodiments and of being practiced in various ways.

The following non-limiting examples shall serve to illustrate the various embodiments of the present invention. In each of the examples, the carrier was cordierite.

EXAMPLES

1. Formation of the First Catalytic Layer

A portion of a solution of the palladium component and a portion of a solution of the platinum component were mixed with a high surface area lanthana-alumina and water to form a wet powder and achieve incipient wetness. Separately, another portion of a solution of the palladium component and another portion of a solution of the platinum component were mixed with a thermostable lanthana-alumina and water to form a wet powder and achieve incipient wetness. Ceria-zirconia, octanol, acetic acid and zirconium acetate were added and combined with the Pd/Pt+support mixture in a planetary mixer (P-mixer). The wet powder preparation was milled to a particle size of 90%=5-15 μm. The slurry was coated onto the monolith carrier using deposition methods known in the art for depositing the catalyst on a substrate. After coating, the carrier with the undercoat and the first catalytic layer was dried and calcined at a temperature of 550° C. for about 1-2 hour. The final composition of the first catalytic layer was as follows: lanthana-stabilized alumina in the range of 14-20% of dry gain (DG), OSC 60-75% of DG, zirconium oxide 7-12% of DG, palladium 3-3.5% of DG and platinum 0.05-0.07% of DG.

A second sample was also prepared in the same manner, wherein the composition of the first catalyst layer contained palladium in the range of 3.1 to 3.7% of DG and no platinum.

2. Formation of the Second Catalytic Layer

The rhodium component and the platinum component were diluted in water and mixed with thermostable OSC (rare earth stabilized ceria zirconia) to achieve incipient wetness. The Rh/Pt+support mixture was added slowly to octanol, water and an organic base while maintaining the pH above 7. Thermostable ceria-zirconia and zirconium nitrate were added and the pH adjusted to 3.5-4.5 as needed. The wet powder was milled to a particle size of 90%=5-15 μm and coated onto the first catalytic layer using deposition methods known in the art for depositing the catalyst on a substrate. After coating, the catalyst article was dried and calcined at a temperature of 550° C. for about 1-2 hour. The final composition of the second catalytic layer was as follows: rare earth stabilized ceria zirconia 90-98% of DG, $ZrO_2$ 2-3% of DG, Pt 0.55 to 0.75% of DG and Rh 0.32-0.42% of DG.

A second sample was also prepared in the same manner, wherein the composition of the second catalytic layer contained Rh 0.7-0.9% of DG and no platinum.

3. Light-Off Evaluation

Experimental catalyst articles prepared above were tested in a model reactor to evaluate CO, NO and HC light-off. Catalyst 1 had a metal loading of 65 g/ft$^3$ and a Pt/Pd/Rh ratio of 2/10/1. Catalyst 2 had a metal loading of 65 g/ft$^3$ and a Pt/Pd/Rh ratio of 0/5/1. Catalyst 1 and Catalyst 2 were compared to a catalyst having a single layer of palladium-only with 70 g/ft$^3$ loading (the "Pd-Catalyst"). This corresponded in composition to the first catalytic layer of Catalyst 2. Performance of the experimental catalysts was also compared to a two-layer catalyst article comparable in composition to Catalyst 1 but with a less-thermostable OSC in the second catalytic layer (the "Reference—Catalyst"). All catalysts were aged for 4 hr. at 1050° C. in 10% steam prior to testing.

The results are shown in the bar chart of FIG. 1. Light off temperatures for all exhaust gas components were substantially reduced for all catalysts as compared to the OSC Catalyst. Catalyst 1 and the Pd-Catalyst had a lower light off temperature for all exhaust components than Catalyst 2. However, light off temperatures for Catalyst 2 and the Pd-Catalyst were essentially equivalent.

The corresponding light off curves for these experiments showed that the curves for Catalyst 1 and Catalyst 2 produced substantially higher maximum CO conversion than the Pd-Catalyst. For HC conversion, the Catalyst 1 and Pd-Catalyst curves were substantially similar throughout the experimental temperature range. In this case, however, Catalyst 2 exhibited a substantially higher maximum level of HC conversion than Catalyst 1. Maximum NO conversion was also somewhat higher for Catalyst 2. When compared to the Reference—Catalyst, both experimental catalysts produced substantially higher maximum CO, NO and HC conversion levels.

What is claimed is:

1. A catalyst article for use in a small engine comprising:
   a first catalytic layer formed on a carrier, the first catalytic layer comprising i) an oxygen storage component that is about 50-90% by weight of the first catalytic layer and ii) a palladium component in an amount of about 2-5% by weight of the first catalytic layer, wherein the palladium component is substantially the only platinum group metal component in the first catalytic layer, and;
   a second catalytic layer formed on the first catalytic layer, the second catalytic layer comprising a rhodium component in an amount of about 0.2-1% by weight of the second catalytic layer, wherein the second catalytic layer does not contain palladium and the rhodium component is associated with a thermostable oxygen storage component.

2. The catalyst article of claim 1 wherein the palladium component is present at about 3-4% by weight of the first catalytic layer.

3. The catalyst article of claim 1 wherein the rhodium component is present at about 0.3-0.9% by weight of the second catalytic layer.

4. The catalyst article of claim 1 further comprising a refractory metal oxide undercoat on the carrier.

5. The catalyst article of claim 1 wherein the oxygen storage component in the second catalytic layer is present in an amount of 80-99% by weight of the second catalytic layer.

6. The catalyst article of claim 5 wherein the oxygen storage component in the second catalytic layer is ceria-zirconia.

7. The catalyst article of claim 1 wherein the carrier is selected from the group consisting of metal carriers, ceramic carriers and wire mesh.

8. The catalyst article of claim 1 comprising about 20-100 g/ft$^3$ of platinum group metals.

9. The catalyst article of claim 8 comprising about 25-75 g/ft$^3$ platinum group metals.

10. The catalyst article of claim 1 wherein the first catalytic layer further comprises about 0-0.5% by weight of a platinum component and the second catalytic layer further comprises about 0.2-1% by weight of a platinum component.

11. The catalyst article of claim 10 wherein the first catalytic layer comprises about 0.04-0.08% by weight of the platinum component and the second catalytic layer comprises about 0.5-1% by weight of the platinum component.

12. A method of treating exhaust from a small engine comprising hydrocarbons and nitrogen oxides comprising:
   contacting the exhaust with a catalyst article, wherein the catalyst article comprises
   i) a first catalytic layer coated on a carrier, wherein the first catalytic layer comprises an oxygen storage component that is about 50-90% by weight of the first catalytic layer, and a palladium component in an amount of about 2-5% by weight of the first catalytic layer, wherein the palladium component is substantially the only platinum group metal component in the first catalytic layer, and;
   ii) a second catalytic layer coated on the first catalytic layer, the second catalytic layer comprising a rhodium component in an amount of about 0.2-1% by weight of the second catalytic layer, wherein the second catalytic layer does not contain palladium and the rhodium component is associated with a thermostable oxygen storage component support.

13. The method of claim 12 wherein the exhaust is contacted with a catalyst article comprising about 80-99% by weight of the oxygen storage component in the second catalytic layer.

14. The method of claim 12 wherein the exhaust is contacted with a catalyst article comprising about 25-75 g/ft$^3$ of platinum group metals.

15. The method of claim 12 wherein the exhaust is contacted with a catalyst article comprising an oxygen storage component in the second catalytic layer selected from the group consisting of ceria-zirconia and ceria.

16. The method of claim 12 wherein the exhaust is contacted with a catalyst article comprising an oxygen storage component in the first catalytic layer selected from ceria, praseodymium, neodymium, and mixed oxides of any one or more of cerium, neodymium and praseodymium.

17. The method of claim 12 wherein the exhaust is contacted with a catalyst article further comprising a refractory metal oxide undercoat.

18. The method of claim 12 wherein the exhaust is contacted with a catalyst article further comprising 0-0.5% by weight of a platinum component in the first catalytic layer and 0.2-1% by weight of a platinum component in the second catalytic layer.

19. A method of making a catalyst article comprising:
   forming a first catalytic layer on a carrier by depositing a slurry on the carrier or, optionally, on a refractory metal oxide undercoat adhered to the carrier, the slurry comprising an oxygen storage component that provides about 50-90% by weight of the oxygen storage component in the first catalytic layer and a palladium component, wherein the palladium component is substantially the only platinum group metal component in the first catalytic layer, and wherein the palladium component is present in an amount sufficient to provide about 2-5% by weight of the palladium component in the first catalytic layer;
   drying the first catalytic layer;
   forming a second catalytic layer on the first catalytic layer by depositing a slurry on the first catalytic layer, the slurry comprising a rhodium component associated with a thermostable oxygen storage component support, wherein the rhodium component is present in an amount sufficient to provide about 0.2-1% by weight of the rhodium component in the second catalytic layer, and;
   drying the second catalytic layer.

20. A small engine system comprising a two stroke engine, wherein the system comprises an exhaust gas outlet for discharging exhaust gas and a catalytic article in accordance with claim 1 proximate to the exhaust gas outlet.

* * * * *